United States Patent
Francis et al.

(10) Patent No.: US 7,190,865 B2
(45) Date of Patent: Mar. 13, 2007

(54) HERMAPHRODITIC U-GUIDE ALIGNMENT STRUCTURES AND METHOD THEREOF

(75) Inventors: Kurt Francis, Yuma, AZ (US); Sai T. Chu, Columbia, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 10/827,136

(22) Filed: Apr. 19, 2004

(65) Prior Publication Data

US 2005/0232546 A1  Oct. 20, 2005

(51) Int. Cl.
*G02B 6/30* (2006.01)
(52) U.S. Cl. .......................... 385/52; 385/50; 385/51; 385/25
(58) Field of Classification Search ............ 385/49–52
See application file for complete search history.

(56) References Cited

U.S. PATENT DOCUMENTS

| | | | |
|---|---|---|---|
| 5,046,813 A | 9/1991 | Itoh et al. | |
| 5,170,456 A | 12/1992 | Itoh et al. | |
| 5,175,781 A | 12/1992 | Hockaday et al. | |
| 5,559,915 A | 9/1996 | Deveau | |
| 5,677,973 A | 10/1997 | Yuhara et al. | |
| 5,703,973 A | 12/1997 | Mettler et al. | |
| 5,970,192 A * | 10/1999 | Osugi et al. | 385/49 |
| 6,122,423 A * | 9/2000 | You et al. | 385/49 |
| 6,181,856 B1 | 1/2001 | Brun | |
| 6,278,814 B1 | 8/2001 | Song et al. | |
| 6,556,751 B1 | 4/2003 | Lee et al. | |
| 6,654,523 B1 * | 11/2003 | Cole | 385/52 |
| 2003/0169422 A1 * | 9/2003 | Mukai | 356/399 |
| 2004/0120651 A1 * | 6/2004 | Huang | 385/52 |

OTHER PUBLICATIONS 8-wavelength photonic integrated 2 + 2 WDM cross-connect switch using 2 + N phased-array waveguide grating (PAWG) multi/demultiplexers, Electronics Letters, vol. 33, No. 7, dated Mar. 27, 1997, pp. 592-594.
Polarization Independent InP WDM Multiplexer/Demultiplexer Module, Emillo Gini, Werner Hunziker, and Hans Melchior, Journal of Lightwave Technology, vol. 16, No. 4, Apr. 1998, pp. 625-630.

* cited by examiner

*Primary Examiner*—Frank G. Font
*Assistant Examiner*—Eric Wong
(74) *Attorney, Agent, or Firm*—Dunlap, Codding & Rogers LLP

(57) ABSTRACT

The invention comprises a method of connecting an integrated optical waveguide circuit component to an optical fiber array. The invention includes the steps of: providing an integrated optical waveguide circuit component having an array of N wave guide ports for optical processing that contain a subset of u-waveguides (one or more) structures for optimizing optical alignment; providing an optical fiber array having an array of at least N optical fibers, and positioning the optical fiber array adjacent to the circuit component so that photons emitted from the optical fiber array ports are coupled into the respective individual corresponding u-waveguide port(s) and then back into the corresponding optical fiber coupling ends of the optical fiber array.

21 Claims, 3 Drawing Sheets

HERMAPHRODITIC U-GUIDE ALIGNMENT STRUCTURES AND METHOD THEREOF

BACKGROUND OF THE INVENTION

1. Field of Invention

The present invention relates to a method of aligning fiber optic arrays to integrated optical waveguide circuit components.

2. Prior Art

Integrated optical waveguide circuit devices, such as planar waveguides, lightwave optical circuits, and integrated optical devices on planar glass or semiconductor substrates are becoming increasingly important in multi-wavelength transmissions systems, fiber-to-the-home, and optical telecommunications systems.

To function, a light guiding waveguide region in the optical device must be interconnected or pigtailed with a light guiding waveguide region in an optical fiber or another optical device. The interconnection requires low loss of typically less than 0.2 dB per connection, environmental reliability against heat and humidity, and cost effectiveness. Achieving a low loss connection requires extremely high precision alignment of the light guiding waveguide regions.

One way to align the waveguide region in planar optical devices with the light guiding region in an optical fiber is by active alignment, wherein the waveguide regions of the input fiber optic array are butted together with the optical processing chip. The alignment is then monitored with an optical monitoring tool, typically a separate output fiber optic array, and the abutting waveguide regions are then secured together. U.S. Pat. No. 6,181,856; U.S. Pat. No. 6,278,814; and U.S. Pat. No. 5,559,915 are incorporated by reference herein.

Another approach is passive alignment, which involves aligning the waveguide regions by mechanical means. For example, a planar optical device may be aligned with an array of fibers or another planar device by using a pair of connector devices, fabricated by forming V-grooves on a silicon wafer that support a planar waveguide surrounded by a plastic molded connector plug. The V-grooves are precisely located on the wafer, and the V-grooves support guide pins. The guide pins are positioned to be received by guide holes on an oppositely disposed connector plug, which contains an array of optical fibers. Connection of the two plug ends passively aligns the planar waveguide and the array of fibers. Such prior methods rely on at least two precision v-groove optical fiber arrays and/or other high tolerance precision mechanical structures along with the integrated optical component to complete the assembly. The combinations of these components do not provide an economic means to precisely align arrays of optical waveguides with optimized optical coupling, due to the high cost of each individual component.

SUMMARY OF THE INVENTION

Accordingly, the present invention is directed to a method of aligning and connecting an array of optical fibers to an optical processing chip containing particular optical waveguides and an apparatus for coupling such waveguide arrays that substantially obviates one or more of the problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the apparatus, process, and compositions particularly pointed out in the written description and claims hereof as well as the drawings.

To achieve these and other advantages and in accordance with the purpose of the invention, as embodied and broadly described, the invention comprises a method of connecting an integrated optical waveguide circuit component to an optical fiber array. The invention includes the steps of: providing an integrated optical waveguide circuit component having an array of N wave guide ports for optical processing that contain a subset of u-waveguides (one or more) structures for optimizing optical alignment; providing an optical fiber array having an array of at least N optical fibers, and positioning the optical fiber array adjacent to the circuit component so that photons emitted from the optical fiber array ports are coupled into the respective individual corresponding u-waveguide port(s) and then back into the corresponding optical fiber coupling ends of the optical fiber array. The method further includes positioning the optical distal fiber array terminal ends corresponding to the output half of the u-waveguide structures on the optical waveguide circuit component to the input of an optical power collection and concentrating member that collects the photons that exit the distal terminal ends and concentrates the photons on an optical power sensor sensing the value representative of the total optical power of the photons concentrated on the optical power sensor that have been emitted from the u-waveguide ports and coupled into the respective individual corresponding optical fiber coupling ends and exited from the distal terminal ends of the optical fibers. The method further includes adjusting the relevant position of the optical fiber array to the circuit component through a manual or automated system so that the sensed total optical power of the photons from the u-waveguides is maximized and securing this position of the optical fiber array to the circuit component when the sensed value representative of the total optical power is at a maximum. Systems for the alignment and attachment of fiber blocks to optical chips are commercially available from sources such as Newport Corporation (Irvine, Calif.), one example would be any combination of AutoALign 8100 semi-custom system.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate embodiments of the invention and, together with the description, serve to explain the principles of the invention.

DETAILED DESCRIPTION OF THE INVENTION

The invention comprises a method of aligning an array of optical fibers with an optical waveguide circuit component wherein the total optical power outputted from the optical u-guide of the optical waveguide circuit component is maximized. The method of optimizing the coupling to the subset of alignment u-waveguides furthermore aligns the remaining fiber block waveguides with their corresponding input/output waveguides on the integrated optical waveguide circuit.

The invention includes a method of connecting an integrated optical waveguide circuit component with an optical fiber array, which includes the step of providing an integrated optical u-guide circuit component having optical waveguide ports. Methods described include a single u-guide structure and a double u-guide structure. This method also applies to higher numbers of u-guide structures and additional functional optical input/output waveguides of the integrated optical waveguide circuit Reference will now be made in detail to the present preferred embodiments of the invention, examples of which are illustrated in the accompanying drawings.

Figure 1:
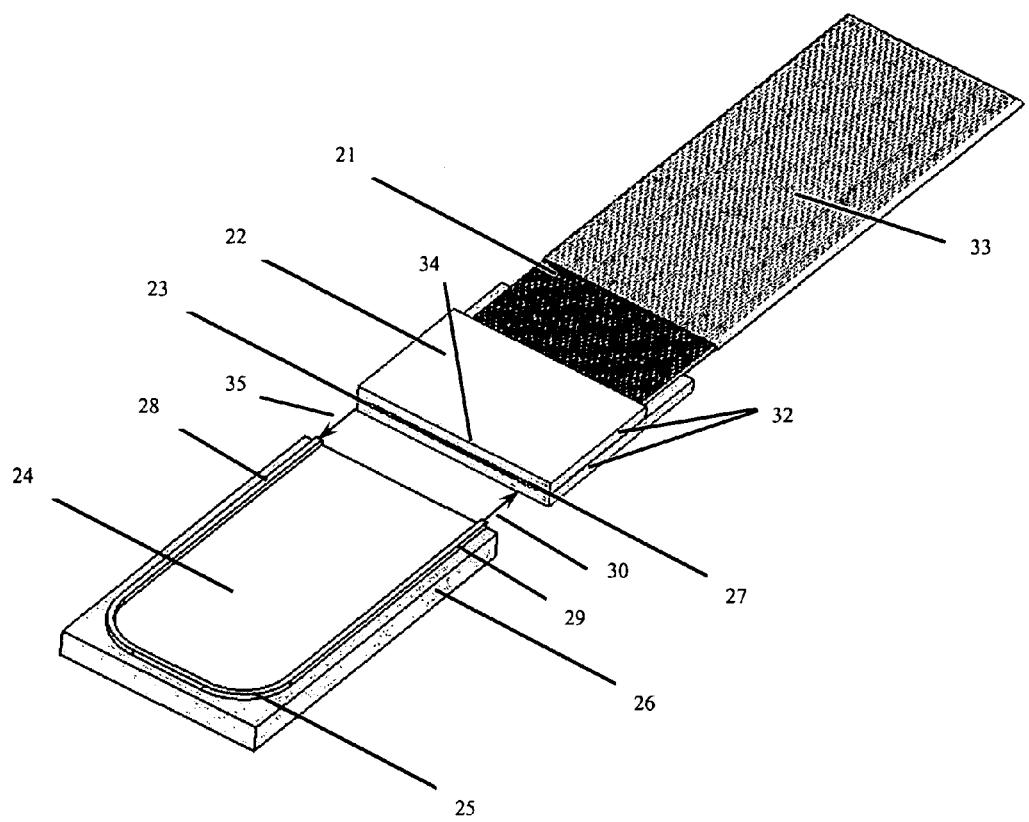
FIG. 1 is an example of an optical waveguide circuit component with a single u-guide being coupled to an array optical fibers.
Figure 2:
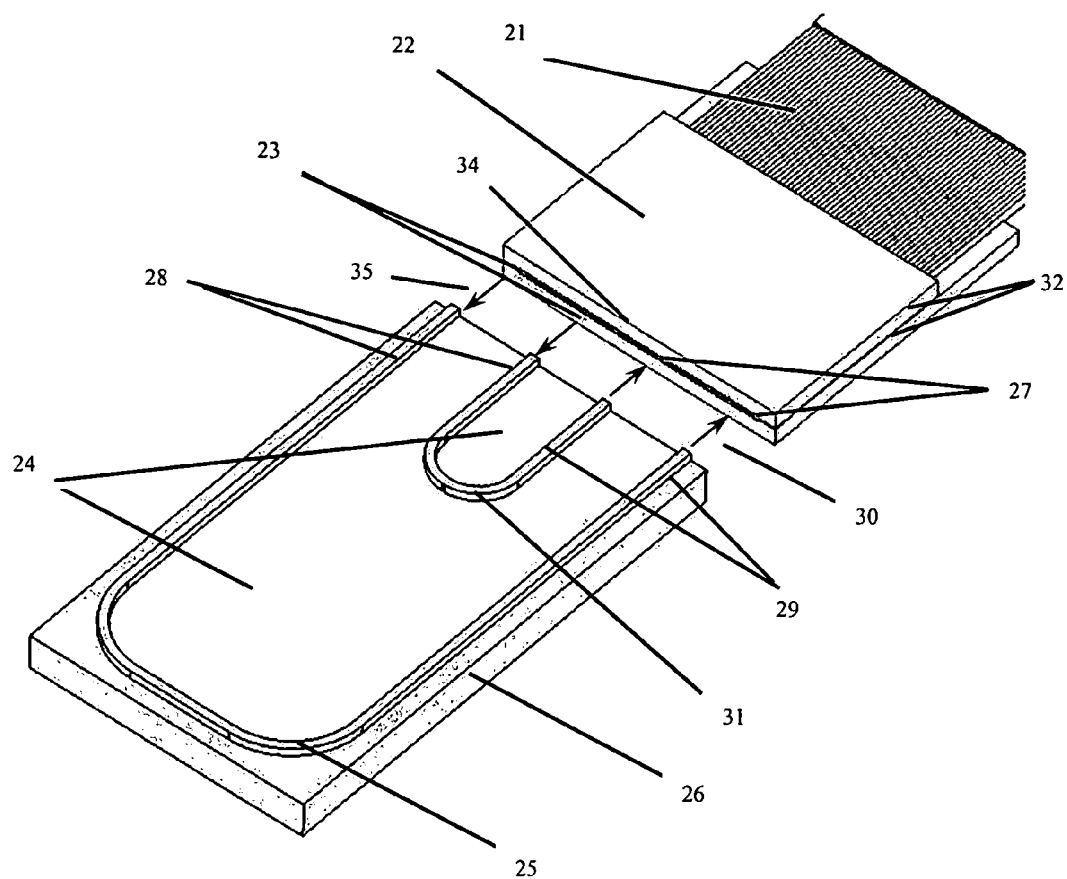
FIG. 2 is an example of an optical waveguide circuit component with a double u-guide being coupled to an array optical fibers.
Figure 3:
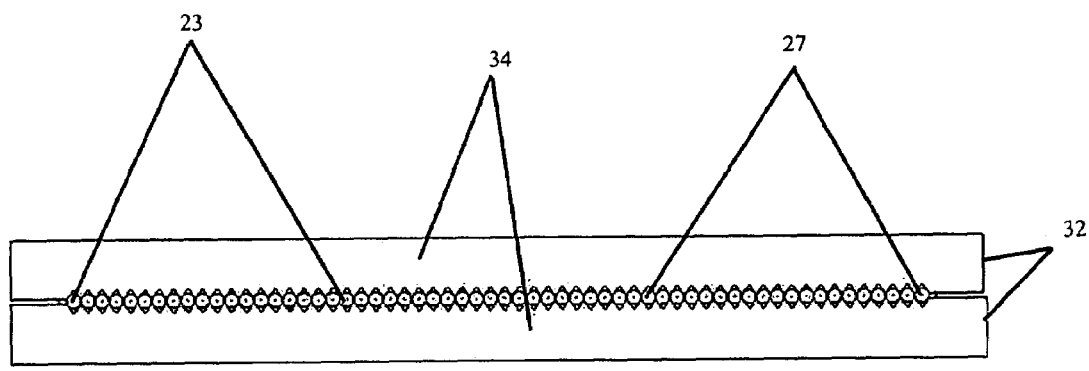
FIG. 3 is an example of a possible end face of an array of optical fibers.

An exemplary embodiment of the method of the present invention is shown in FIGS. 1–3.

As embodied herein and referring to FIGS. 1 and 2, the method of connecting an integrated optical waveguide circuit component 26 with an optical fiber array 22 includes the step of providing integrated optical u-waveguide(s) circuit component 25 and/or 31 going around, over, or under the optical processing area 24. The processing area 24 will have an array of N waveguide ports including the u-waveguide structure(s) 25 and/or 31 as shown in FIGS. 1 and 2. Preferably optical waveguide circuit component 26 has an array of waveguide ports located in processing area 24 including the u-waveguide structure(s) 25 and/or 31 is substantially linear, with waveguide ports spaced apart and oriented in a regulated and standardized manner.

The method further includes providing optical fiber array 22 having an array of M optical fibers 33, with each of the optical fibers 21 having a coupling ending at the fiber optic array face 34, as shown in FIG. 3, for optical coupling to a respective individual corresponding waveguide port 28 and 29 of circuit component 26, also including the waveguide ports included in the optical processing area 24, with a selection of the M optical fibers 21 (some or all) terminating with an individual optical fiber terminal end 23 as shown in FIG. 3. Noting that not all optical fibers or component waveguides need to be in use, in fact it is common that only a subset of the M optical fibers will be matched with N optical waveguides. Preferably optical fiber coupling ends at the fiber optic array face 34 are in a substantially linear array, with coupling ends at the fiber optic array face 34, spaced apart and oriented in a regulated and standardized manner which corresponds with and matches that of array 26 of waveguide ports located in processing area 24 including u-waveguide structure(s) 25 and/or 31, such can be obtained by holding the optical fiber array 33 with an optical fiber array holder 32, such as a fiber array holder block that utilizes V-grooves. Preferably optical fibers 21 are single mode optical fibers.

The method further includes positioning optical fiber array 22 adjacent to optical circuit component 26 so that photons emitted 35 from fiber optic array port(s) 23 are coupled into the respective individual corresponding u-waveguide input arm(s) 28. Then positioning optical fiber array 22 such that the photons emitted 30 from the respective individual corresponding u-waveguide output arm(s) 29 are coupled into the respective individual corresponding optical fiber array fiber(s) 27.

The method further includes using an auto-alignment system for adjusting the relevant position of optical fiber array 22 to circuit component 26 so that the sensed value representative of the total optical power of the exited photons is maximized and then securing this position of the optical fiber array 22 to circuit component 26.

Providing optical fiber array 22 includes providing an optical fiber array held in an optical fiber array holder 32 wherein coupling ends of optical fibers 23 and 27 are contained by optical fiber array holder 32 which is designed to match the spacing, placement and orientation of respective u-waveguide ports 28 and 29 of optical circuit component 26. Optical fiber array holder 32 may comprise V-grooves that are precision formed such as by machining or like methods, with optical fibers 21 contained within the V-grooves. Optical fiber array 22 is preferably comprised of an optical fiber array ribbon 33, wherein optical fiber array ribbon 33 flexibly constrains optical fibers 21. Preferably the terminal end of optical fiber array ribbon 33 is cleaved, diced, or polished provided such that optical fiber terminal ends 34 are optically clear of any scratches or digs.

Preferably the step of securing the position of optical fiber array 22 to circuit component 26 comprises adhering optical fiber array face 32 to circuit component 26 so that the maximized sensed value of total optical power is maintained. Adhering can be achieved with an epoxy, glue, or other adhering compositions.

While the preferred embodiments have been described, it will be apparent to those skilled in the art that various modifications may be made to the embodiments without departing from the spirit of the present invention. Such modifications are within the scope of this invention.

We claim:

1. A method of establishing optical communication, said method comprising the steps of:
    providing an integrated optical waveguide circuit component having, an optical processing area, N input and output waveguide ports and at least one waveguide structure, the at least one waveguide structure going around the optical processing area;
    providing an optical fiber array having an array of M optical fibers, said optical fibers each having a coupling end for optical coupling to at least a portion of the input and output waveguides of said integrated optical waveguide circuit component, wherein at least a portion of said optical fibers terminate with an individual optical fiber terminal end;
    positioning said optical fiber array adjacent to said integrated optical waveguide circuit component so that a plurality of photons emitted from the coupling end of at least one of the optical fibers are coupled into the at least one waveguide structure of said integrated optical waveguide circuit component and coupled back into the coupling end of at least one of the optical fibers of the optical fiber array adjacent to said integrated optical waveguide circuit component;
    adjusting the relevant position of said optical fiber array to said integrated optical waveguide circuit component so that a sensed value representative of the total optical power of the photons coupled back into the coupling end of the at least one optical fiber is maximized; and
    securing said position of said optical fiber array to said integrated optical waveguide circuit component.

2. The method of claim 1, wherein providing an optical fiber array further comprises providing an optical fiber array held in an optical fiber array holder, wherein said coupling ends of the optical fibers are contained by said optical fiber array holder.

3. The method of claim 1, wherein said optical fiber array is comprised of an optical fiber array ribbon.

4. The method of claim 3, wherein said optical fiber terminal ends are contained by said optical fiber array ribbon.

5. The method of claim 2, wherein securing said position of said optical fiber array to said integrated optical waveguide circuit component comprises adhering said optical fiber array holder to said integrated optical waveguide circuit component so as to maintain the maximized sensed value.

6. The method of claim 1, wherein M and N are at least two.

7. The method of claim 1, wherein said integrated optical waveguide circuit component comprises a planar substrate.

8. The method of claim 1, wherein said integrated optical waveguide circuit component comprises optical wavelength processing devices.

9. The method of claim 1, wherein adjusting the relevant position comprises adjusting the relevant position in at least one of a first translation direction, a second translation direction, and a rotation direction.

10. The method of claim 1, wherein the relevant position of said optical fiber array to said integrated optical waveguide circuit component is adjusted with an auto-alignment system.

11. The method of claim 10, wherein said sensed value representative of the total optical power is inputted into said auto-alignment system.

12. The method of claim 11, wherein said auto-alignment system adjusts the relevant position of said optical fiber array to said integrated optical waveguide circuit component in at least at least one of a first translation direction, a second translation direction and a rotation direction based on the sensed value representative of the total optical power that is inputted in the auto-alignment system.

13. A method of establishing optical communication, comprising the steps:
providing an integrated optical waveguide circuit component having a first side, an optical processing area, N waveguide ports located on the first side, and at least one waveguide structure, the at least one waveguide structure having an input and an output located on the first side, with the input positioned near an end of the first side, and the output positioned near an opposite end of the first side;
providing an optical fiber array having an array of M optical fibers, said optical fibers each having a coupling end for optical coupling to at least a portion of the waveguides of said integrated optical waveguide circuit component;
positioning said optical fiber array adjacent to said integrated optical waveguide circuit component so that a plurality of photons emitted from the coupling end of at least one of the optical fibers are coupled into the at least one waveguide structure of said integrated optical waveguide circuit component and coupled back into the coupling end of at least one of the optical fibers of the optical fiber array adjacent to said integrated optical waveguide circuit component;
adjusting the relevant position of said optical fiber array to said integrated optical waveguide circuit component so that a sensed value representative of the total optical power of the photons coupled back into the coupling end of the at least one optical fiber is maximized.

14. The method of claim 13, wherein providing an optical fiber array further comprises providing an optical fiber array held in an optical fiber array holder, wherein said coupling ends of the optical fibers are contained by said optical fiber array holder.

15. The method of claim 13, wherein said optical fiber array is comprised of an optical fiber array ribbon.

16. The method of claim 14, wherein securing said position of said optical fiber array to said integrated optical waveguide circuit component comprises adhering said optical fiber array holder to said integrated optical waveguide circuit component so as to maintain the maximized sensed value.

17. The method of claim 13, wherein said integrated optical waveguide circuit component comprises optical wavelength processing devices.

18. The method of claim 13, wherein adjusting the relevant position comprises adjusting the relevant position in at least one of a first translation direction, a second translation direction, and a rotation direction.

19. The method of claim 13, wherein the relevant position of said optical fiber array to said integrated optical waveguide circuit component is adjusted with an auto-alignment system.

20. The method of claim 19, wherein said sensed value representative of the total optical power is inputted into said auto-alignment system.

21. A method of establishing optical communication, comprising the steps of:
providing an integrated optical waveguide circuit component having a first side, N waveguide ports located on the first side, and at least one waveguide structure, the at least one waveguide structure having an input and an output located on the first side with at least one of the waveguide ports between the input and the output of the waveguide structure;
providing an optical fiber array having an array of M optical fibers, said optical fibers each having a coupling end for optical coupling to at least a portion of the waveguides of said integrated optical waveguide circuit component;
positioning said optical fiber array adjacent to said integrated optical waveguide circuit component so that a plurality of photons emitted from the coupling end of at least one of the optical fibers are coupled into the at least one waveguide structure of said integrated optical waveguide circuit component and coupled back into the coupling end of at least one of the optical fibers of the optical fiber array adjacent to said integrated optical waveguide circuit component;
adjusting the relevant position of said optical fiber array to said integrated optical waveguide circuit component so that a sensed value representative of the total optical power of the photons coupled back into the coupling end of the at least one optical fiber is maximized.

* * * * *